US010838460B2

(12) United States Patent
Wakako et al.

(10) Patent No.: US 10,838,460 B2
(45) Date of Patent: Nov. 17, 2020

(54) MONITORING VIDEO ANALYSIS SYSTEM AND MONITORING VIDEO ANALYSIS METHOD

(71) Applicant: Panasonic i-PRO Sensing Solutions Co., Ltd., Fukuoka (JP)

(72) Inventors: Takeshi Wakako, Kanagawa (JP); Youhei Koide, Fukuoka (JP)

(73) Assignee: Panasonic i-PRO Sensing Solutions Co., Ltd., Fukuoka (JP)

( * ) Notice: Subject to any disclaimer, the term of this patent is extended or adjusted under 35 U.S.C. 154(b) by 0 days.

(21) Appl. No.: 15/659,435

(22) Filed: Jul. 25, 2017

(65) Prior Publication Data
US 2018/0101194 A1    Apr. 12, 2018

(30) Foreign Application Priority Data

Oct. 7, 2016    (JP) .................. 2016-199560

(51) Int. Cl.
*G06F 1/16* (2006.01)
*H04L 29/06* (2006.01)
(Continued)

(52) U.S. Cl.
CPC .......... *G06F 1/163* (2013.01); *H04L 65/4069* (2013.01); *H04L 65/60* (2013.01);
(Continued)

(58) Field of Classification Search
CPC ........ B60R 2300/105; B60R 2300/207; B60R 2300/303; G06F 1/163; G06F 3/0482; G06F 3/04847; H04L 65/4069; H04L 65/60; H04N 1/00106; H04N 5/77; H04N 7/185; H04N 5/772; H04N 7/188; H04N 7/181; H04N 7/18; G11B 27/22; G11B 27/309;
(Continued)

(56) References Cited

U.S. PATENT DOCUMENTS 9,251,424 B2 *   2/2016   Thornton ................. H04N 7/18
2007/0053660 A1   3/2007   Abe et al.
(Continued)

FOREIGN PATENT DOCUMENTS

JP    2006-148842 A    6/2006
JP    2007-72520 A     3/2007
(Continued)

OTHER PUBLICATIONS

Japanese Notice of Reasons for Refusal dated Jul. 21, 2020, for the corresponding Japanese Patent Application No. 2016-199560, 6 pages (With English Machine Translation).

*Primary Examiner* — Mulugeta Mengesha
*Assistant Examiner* — Alazar Tilahun
(74) *Attorney, Agent, or Firm* — Seed IP Law Group LLP

(57) ABSTRACT

A monitoring video analysis system includes a wearable camera that is held or possessed by a user, and a back end server that receives a captured video. The wearable camera records a captured video by capturing a video of a scene for each ten minutes. The back end server determines a face of a person appearing in n (n is an integer of two or more) captured videos by using a plurality of captured videos of the scene for each 10 minutes, and displays a thumbnail list UI in which the determined face of the person is registered, on a monitor.

14 Claims, 9 Drawing Sheets

(51) Int. Cl.
  *H04N 1/00* (2006.01)
  *H04N 5/77* (2006.01)
  *H04N 7/18* (2006.01)
(52) U.S. Cl.
  CPC ........... *H04N 1/00106* (2013.01); *H04N 5/77* (2013.01); *H04N 5/772* (2013.01); *H04N 7/185* (2013.01); *B60R 2300/105* (2013.01); *B60R 2300/207* (2013.01); *B60R 2300/303* (2013.01)
(58) Field of Classification Search
  CPC ..... G11B 27/28; G11B 27/34; G11B 27/3081; G11B 27/102; G06Q 10/00; G06T 2207/30241; G06T 2207/30232; G06T 2207/30196; G06T 2207/20076; G06T 2207/10016; G06T 7/74; G06T 7/292; G06K 9/00771; G06K 9/00805; G06K 9/3241
  See application file for complete search history.

(56) References Cited

U.S. PATENT DOCUMENTS

| | | | |
|---|---|---|---|
| 2007/0228159 A1 | 10/2007 | Kashiwa et al. | |
| 2010/0104146 A1* | 4/2010 | Momosaki | G06K 9/00295 |
| | | | 382/118 |
| 2010/0195874 A1* | 8/2010 | Isogai | G06F 17/30793 |
| | | | 382/115 |
| 2013/0022244 A1* | 1/2013 | Nagata | G06F 17/30256 |
| | | | 382/103 |
| 2017/0133051 A1* | 5/2017 | Mack | A41D 1/002 |
| 2017/0178678 A1* | 6/2017 | Ross | G11B 27/11 |

FOREIGN PATENT DOCUMENTS

| | | |
|---|---|---|
| JP | 2007-219713 A | 8/2007 |
| JP | 2010-252008 A | 11/2010 |

* cited by examiner

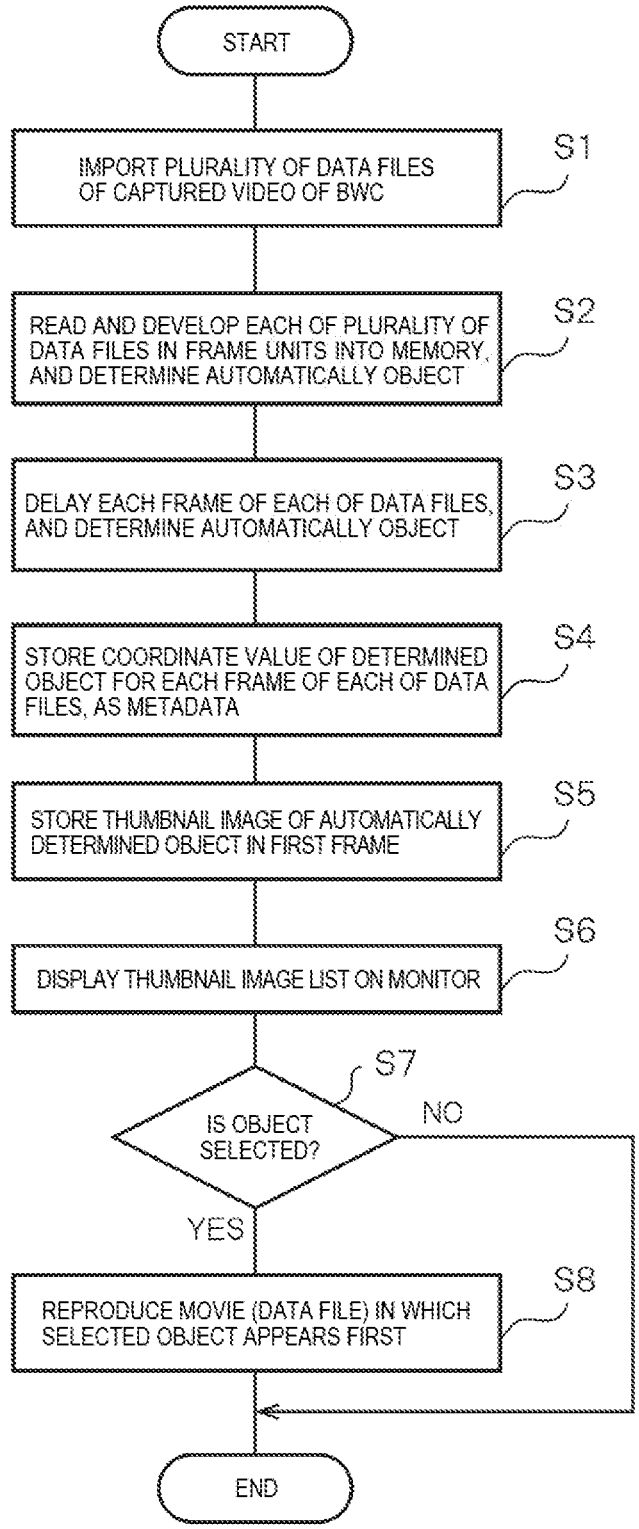

MONITORING VIDEO ANALYSIS SYSTEM AND MONITORING VIDEO ANALYSIS METHOD

BACKGROUND

1. Technical Field

The present disclosure relates to a monitoring video analysis system and a monitoring video analysis method for analyzing a monitoring video captured by an image capturing device.

2. Description of the Related Art

In recent years, for example, an operation method which causes a police officer to hold a wearable camera and records a video captured during patrolling (traveling) into a memory of the wearable camera, is steadily promoted. In particular, in the United States, due to incidents caused by a police officer on patrol for himself or herself, a mounting rate of the wearable camera has been rapidly increasing year by year.

When recording a video, the wearable camera generates a file of video data (video data file) every time a capturing time elapses by a predetermined time (for example, 10 minutes), and records the video data file into a memory. By recording the video captured by the wearable camera as a video data file for each predetermined time, usability of the video (for example, availability which can use the video as necessary) is ensured. Here, the availability means, for example, an index indicating a degree of use and usability as a video, such as being able to use remaining video data files even when one video data file is damaged, by dividing a video of one scene with a long time length into a plurality of video data files with a short time length and recording the plurality of video data files, as compared to a case of recording a long video of one scene as one video data file. In addition, the scene is a section of a video captured in time series with a certain relation. Since the video data files are generated by background processing, there is no blank time zone between the plurality of video data files captured and recorded in time series.

On the other hand, a police officer determines whether or not a suspect does not appear by general citizen in a video of an incident site captured by the wearable camera (monitoring video), by visually checking the frames of the plurality of video data files one by one. Depending on the type of an incident, in general, when determining a suspect, there is a case where a person appearing in the video of the incident site for a long time may be a suspicious person. The video in which a suspect appears may be submitted to a predetermined institution such as a court or a public prosecutor's office, and may be used as an evidence.

In addition, a digital camera with enhanced entertainment is known, by extracting a person commonly appearing in a plurality of image data files constituting a moving image, and displaying a person commonly appearing in the image data files of the moving image at the end of the moving image. For example, such a camera is described in Japanese Patent Unexamined Publication No. 2010-252008.

However, in Japanese Patent Unexamined Publication No. 2010-252008, it is not considered to search a person appearing in the plurality of video data files recorded by the wearable camera which is held or possessed by a user such as a police officer. For this reason, the above-mentioned method is not efficient, in that a police officer searches a suspect by checking all of the frame images constituting the plurality of video data files recorded by the wearable camera which is held or possessed by a user such as a police officer one by one. In addition, efficient solutions are not presented even with reference to Japanese Patent Unexamined Publication No. 2010-252008. Further, since it takes a long time for such visual inspection work, it is difficult to search a suspect quickly.

SUMMARY

The present disclosure has been made in consideration of the above-described circumstances in the art, and an object thereof is to provide a monitoring video analysis system and a monitoring video analysis method capable of quickly searching an object such as a person's face appearing in a plurality of captured videos, and efficiently supporting a search task of an object as a target, by using availability of the captured videos of the wearable camera.

According to the present disclosure, there is provided a monitoring video analysis system including a wearable camera that is held or possessed by a user and a server that receives a captured video of the wearable camera, in which the wearable camera generates and records a captured video of a scene for each predetermined time, and in which the server determines one or more objects appearing in n (n is an integer of two or more) captured videos by using a plurality of captured videos which are captured for each predetermined time in the scene, and displays a list screen including the determined one or more objects on a monitor.

According to the present disclosure, there is provided a monitoring video analysis method causing a server to analyze a captured video of a wearable camera that is held or possessed by a user, the method including: generating and recording a captured video of a scene for each predetermined time by the wearable camera; and receiving the captured video of the wearable camera, determining one or more objects appearing in n (n is an integer of two or more) captured videos by using a plurality of captured videos which are captured for each predetermined time in the scene, and displaying a list screen including the determined one or more objects on a monitor, by the server.

According to the present disclosure, it is possible to quickly search an object such as a person's face appearing in the plurality of captured videos, and efficiently support a search task of an object as a target, by using availability of the captured videos of the wearable camera.

BRIEF DESCRIPTION OF THE DRAWINGS

FIG. 9 is a flowchart explaining in detail one example of an image analysis operation procedure of the back end server according to the present embodiment.

DETAILED DESCRIPTION

Hereinafter, a wearable camera system as an embodiment in which a monitoring video analysis system and a monitoring video analysis method according to the present disclosure are specifically disclosed (hereinafter, referred to as "the present embodiment") will be described in detail with reference to the drawings as appropriate. Here, a detailed explanation more than necessary may be omitted. For example, there is a case where detailed descriptions of well-known matters and redundant explanations for substantially the same configuration may be omitted. This is for avoiding unnecessary redundancy in the following explanation and facilitating understanding by those skilled in the art. The accompanying drawings and the following description are provided such that those skilled in the art can fully understand the present disclosure, and are not intended to limit the scope of the present invention. Further, in the following description, it is assumed that a video is configured with a plurality of frame images (referred simply to as frames in some cases) arranged in time series.

Figure 1:
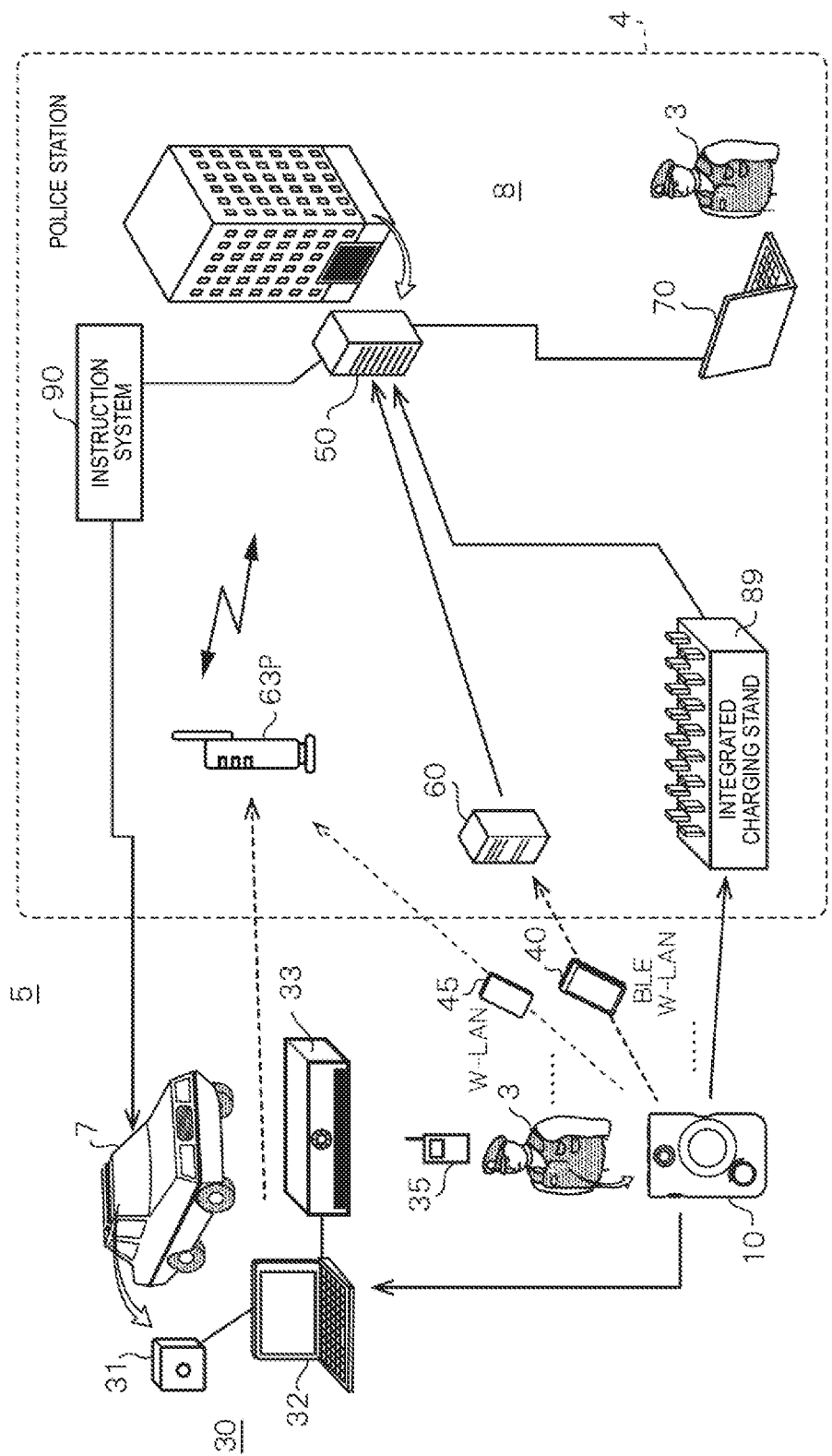
FIG. 1 is a diagram illustrating an example of an overview of a monitoring video analysis system according to the present embodiment.

FIG. 1 is a diagram illustrating an example of an overview of monitoring video analysis system 5 according to the present embodiment. Monitoring video analysis system 5 is configured to include in-car camera system (in-car video system (ICV)) 30 mounted on patrol car 7 (that is, a police patrol car), wearable camera (body-worn camera (BWC)) 10 attached or held on a uniform of police officer 3, and in-police system 8 provided in police station 4.

In-car camera system 30 includes one or more in-car cameras 31, in-car personal computer (PC) 32, and in-car recorder 33, and captures and records a video based on captured images of an incident or the like occurred while traveling of patrol car 7. One or more in-car cameras 31 includes, for example, a camera provided so as to capture an image of the front of patrol car 7, and one or more cameras provided so as to capture an image of each of the left, the right, and the rear of patrol car 7. In-car PC 32 controls operations of in-car camera 31 and in-car recorder 33 according to an instruction by an operation of police officer 3. In-car recorder 33 records video data captured by each of the plurality of in-car cameras 31 in time series.

In-car camera system 30 is connected to back end server (BES) 50 of in-police system 8 via wireless LAN access point 63P of in-police system 8 in a wireless manner. In-car camera system 30 can select specific video data from the video data recorded in in-car recorder 33, and transmit the selected video data to back end server 50 via wireless LAN access point 63P. In addition, in-car camera system 30 is connected to wearable camera 10 in a communicable manner, and records video data captured by wearable camera 10 and sound data collected by wearable camera 10, in in-car recorder 33. In the following description, it is assumed that the sound data includes, for example, a sound of a gunshot when a suspect or a criminal of an incident fires a possessed gun during a patrol or at an incident site.

Wearable camera 10 is attached or held on a uniform of police officer 3 as a user, captures a video of an environment in front of police officer 3 as a subject, and transmits the captured video data and the collected sound data to in-car camera system 30 and back end server 50. The user of wearable camera 10 is not limited to police officer 3, and may be a security guard or a police dog as necessary. In this case, wearable camera 10 divides the captured video of one scene into a plurality of video data files (files of video data), and stores the plurality of video data files into storage unit 15 (refer to FIG. 2). The scene is a section of a video captured in time series with a certain relation. In addition, the scene may mean a place where a video is captured by wearable camera 10 (for example, an incident site or an accident site), and in this case, the "scene" may be interpreted as "a capturing area" or "a capturing site". As described above, wearable camera 10 generates and records a plurality of video data files in time series by capturing a video for each predetermined time. In the present embodiment, a file format of mpeg4 (MP4) which is suitable for moving image distribution on the Internet is used for the video data file. The file format is not limited to MP4, and may be audio video interleave (AVI), QuickTime, windows media video (WMV), flash video (FLV), or the like.

Wearable camera 10 has a feature of dividing a video with a long time length (for example, one hour) into a plurality of video data files instead of making the video as a single video data file, and storing the plurality of video data files. Thus, even when one video data file among the plurality of video data files is damaged and cannot be reproduced in back end server 50 or back end client 70 to be described, other reproducible video data files can remain in a reproducible state, and thus availability of the video data file captured by wearable camera 10 can be ensured to some extent, except for the damaged video data file. In the present embodiment, for example, in a case where a police officer captures a video of an incident site, the captured video of one scene is a video in which the incident site is set as a capturing area. In addition, in a case where the police officer continues to capture a video using wearable camera 10 while moving, the captured video of one scene is a video which is sectioned by a specific time zone, a specific place, or the like, or a video which is continuously captured by wearable camera 10 during a period for which the police officer starts video recording and then stops video recording.

As in wearable camera 10, in-car camera 31 may divide a captured video of one scene into a plurality of video data files for each predetermined time, and record the plurality of video data files. Here, in a case of in-car camera 31, as compared with a case of wearable camera 10, for example, typically, a video that is captured when patrol car 7 is on patrol is a captured video of one scene with a long capturing time length.

In addition, it is assumed that a subject to be captured by wearable camera 10 or in-car camera 31 includes not only a person but also a whole view of an incident site, a crowd (so-called onlookers) gathered near the site, and an environment near a capturing position. Further, police officer 3 possesses police wireless terminal 35 as an example of a wireless communication terminal that receives an instruction from instruction system 90. Typically, police officer 3 carries police wireless terminal 35 to the scene when working outside a police station, such as when patrolling or responding to the scene at the time of occurrence of an incident. In addition, police officer 3 may possess smartphone 40 as an example of a communication terminal which can communicate with wearable camera 10. Smartphone 40 has a telephone function and a wireless communication function, and is used, for example, for an emergency contact from police station 4 or an emergency contact to police station 4. Smartphone 40 is an example of a portable terminal which is widely used.

Wearable camera 10 is connected to back end server 50 directly via in-car camera system 30, or via smartphone 40 or wireless local area network (LAN) access point 45, and thus the video data and the sound data can be transmitted to back end server 50. Smartphone 40 is connected to back end server 50 via a mobile communication network or the Internet network. Wireless LAN access point 45 is connected to back end server 50 via a wired network or a wireless network (the Internet network or the like). In addition, wearable camera 10 is manually connected to integrated charging stand 89 to be described, and thus the video data and the sound data can be transmitted in a wired manner to back end server 50 which is connected to integrated charging stand 89 via a Universal Serial Bus (USB) cable or the like.

In-police system 8 is configured to include back end server 50, back end streaming server (BSS) 60, back end client (BEC) 70, wireless LAN access point 63P, integrated charging stand 89, and instruction system 90, which are provided in police station 4.

Back end server 50 is configured to include a computer and a storage, and manages evidence videos of an incident. Back end server 50 has a face recognition function of recognizing a face in an image frame constituting the video captured by, for example, wearable camera 10 or in-car camera 31, and has a sound recognition function of recognizing the sound data transmitted from wearable camera 10 or in-car camera system 30.

Back end streaming server 60 receives video data which is distributed from wearable camera 10 in a streaming manner, and transmits the received video data to back end server 50. In addition, back end streaming server 60 may receive video data which is distributed from in-car camera system 30 in a streaming manner, and transmit the received video data to back end server 50.

Back end client 70 is configured with, for example, a PC, accesses a suspicious person database (not illustrated) of back end server 50, searches information on an incident such as criminals, and displays the searched result on a display device (for example, a liquid crystal display (LCD) provided in advance in back end client 70) by using a browser or a dedicated application which can display information. In the suspicious person database, for example, a person on the wanted list or a criminal in the past (hereinafter, referred to as an ex-convict) is registered in advance in correlation with information identifying an incident (for example, an incident number).

In addition, back end client 70 can access a sound database of back end server 50, and search information on an incident such as criminals. Back end client 70 may be provided not only inside police station 4 but also outside police station 4. Further, back end client 70 may be any one of a thin client PC and a rich client PC.

Wireless LAN access point 63P is connected to in-car camera system 30 and wearable camera 10 via a wireless LAN (W-LAN) in a wireless manner, and transmits the video data and the sound data recorded in in-car camera system 30 and the video data and the sound data recorded in wearable camera 10, to back end server 50.

Integrated charging stand 89 can hold wearable camera 10 which is held or possessed by each of a plurality of police officers 3, charges power of each wearable camera 10 which is held, and performs wired communication with wearable camera 10. In addition, integrated charging stand 89 has a function of transmitting the video data and the sound data stored in wearable camera 10 to back end server 50. Further, integrated charging stand 89 is connected to back end server 50 via a Universal Serial Bus (USB) cable in a wired manner.

Instruction system 90 includes a police wireless base station apparatus (not illustrated) as an example of a wireless communication apparatus, is connected to back end server 50, and transmits an instruction to each police department under the control of police station 4. Police station 4 is provided with a police wireless system for transmitting an instruction to each police officer. In a case where an incident occurs, for example, based on an instruction from back end server 50, instruction system 90 transmits various dispatch instructions such as emergency dispatch to a site, protection of a site, arrest of a suspect, or support for police officers arrived at the site, to patrol car 7 which is to be dispatched to the incident site and on which the police officer rides, or police wireless terminal 35 possessed by the police officer, in a wireless manner.

Instruction system 90 may output an instruction to a police officer to be dispatched to the incident site, according to an instruction which is input from a police officer. In addition, instruction system 90 may be not directly connected to back end server 50. In this case, when an incident occurs, independently of back end server 50, instruction system 90 may transmit various dispatch instructions, from the police wireless base station apparatus, to patrol car 7 to be dispatched to the incident site or police wireless terminal 35, in a wireless manner.

In monitoring video analysis system 5, in a case where in-car camera system 30 is used, wearable camera 10 is connected to in-car camera system 30 so as to perform data transmission by short-range wireless communication or wired communication using a signal cable such as a USB cable. The video data captured by wearable camera 10 and the sound data collected by wearable camera 10 are transmitted to in-car camera system 30. In-car camera system 30 reproduces the video data and the sound data, performs video recording of the video data, or performs sound recording of the sound data. The video data and the sound data are transmitted to back end server 50.

In-car camera system 30 records the video data captured by in-car camera 31, the video data captured by wearable camera 10, and the sound data collected by wearable camera 10, in in-car recorder 33, and transmits the sound data collected by wearable camera 10 to back end server 50 via a wireless LAN.

In addition, in monitoring video analysis system 5, in a case where wearable camera 10 is directly connected to a network for use, wearable camera 10 is connected to wireless LAN access point 45 or smartphone 40 so as to perform data transmission. For connection between wearable camera 10 and smartphone 40, for example, short-range wireless communication such as Bluetooth (registered trademark) low energy (BLE), or wireless LAN communication using tethering which allows one of wearable camera 10 and smartphone 40 to function as a wireless LAN access point, is used. Wearable camera 10 transmits the video data and the sound data recorded, to back end server 50 via wireless LAN access point 45 or smartphone 40.

In addition, when police officer 3 returns to police station 4 and puts wearable camera 10 on integrated charging stand 89, integrated charging stand 89 charges wearable camera 10, and allows wearable camera 10 to transmit the video data and the sound data recorded in wearable camera 10 to back end server 50 via a USB cable.

When receiving the video data via back end streaming server 60 or directly from wearable camera 10 or in-car camera system 30, back end server 50 records and stores the received video data into a storage. In addition, when receiving the sound data from in-car camera system 30 and wearable camera 10, back end server 50 recognizes a sound included in the sound data, performs a comparison of the recognized sound with sounds registered in the sound database in which preset sound data related to patrols or incidents is registered in advance, and notifies in-car camera system 30 and wearable camera 10 of the comparison result.

Further, when police officer 3 requests, to back end server 50, processing such as search of a sound related to an incident by operating back end client 70, in response to the request from back end client 70, back end server 50 performs an inquiry of a sound registered in the sound database.

Figure 2:
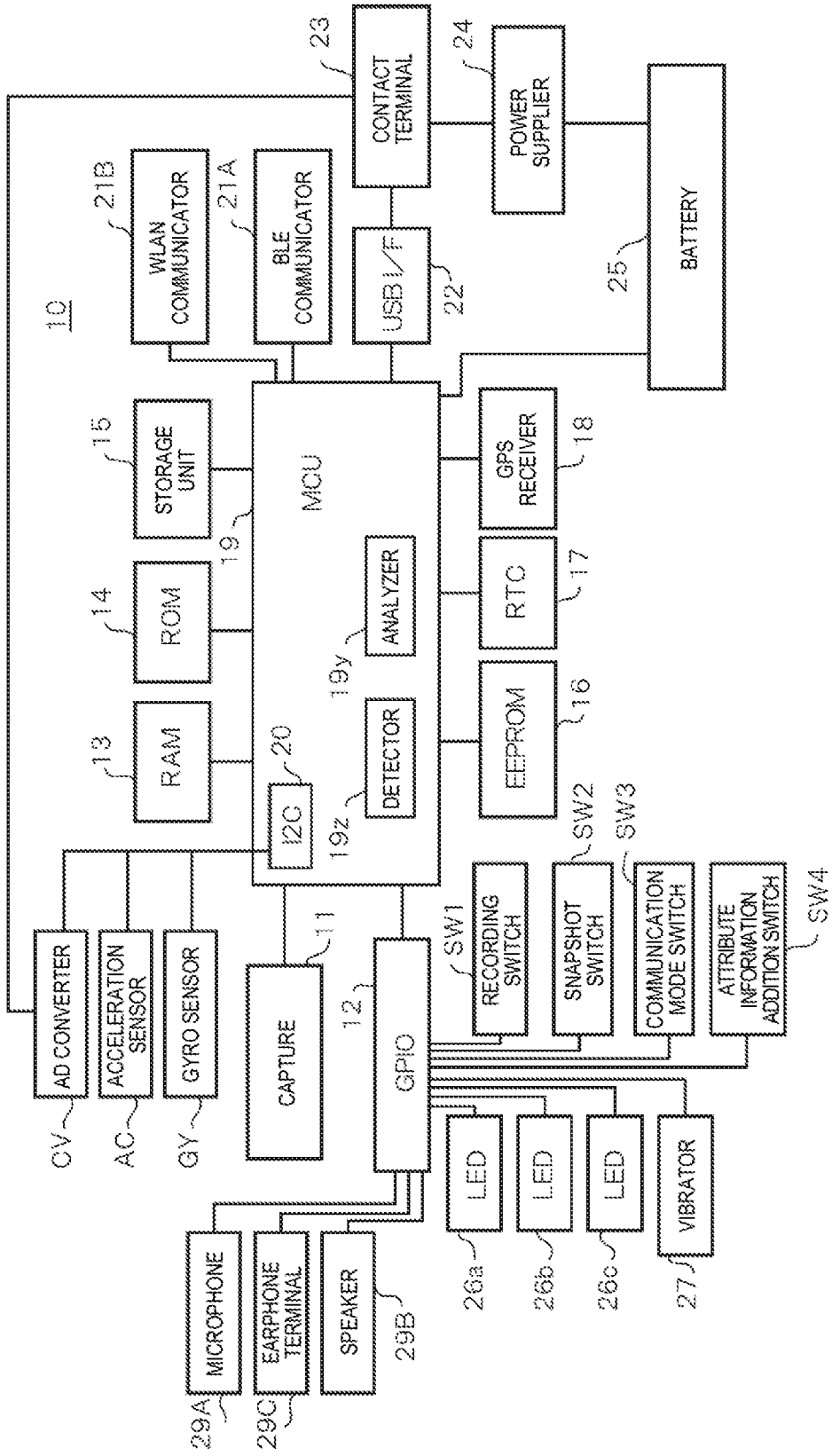
FIG. 2 is a block diagram illustrating an example of an internal configuration of a wearable camera according to the present embodiment.

FIG. 2 is a block diagram illustrating an example of an internal configuration of wearable camera 10 according to the present embodiment. Wearable camera 10 includes capture 11, general purpose input/output (GPIO) 12, random access memory (RAM) 13, read only memory (ROM) 14, and storage unit 15. Wearable camera 10 includes electrically erasable programmable ROM (EEPROM) 16, real time clock (RTC) 17, and global positioning system (GPS) receiver 18. Wearable camera 10 includes micro controller unit (MCU) 19, BLE communicator 21A, WLAN communicator 21B, USB interface (I/F) 22, contact terminal 23, power supplier 24, and battery 25.

Wearable camera 10 includes recording switch SW1, snapshot switch SW2, communication mode switch SW3, and attribute information addition switch SW4.

Wearable camera 10 includes three light emitting diodes (LEDs) 26a, 26b, and 26c, and vibrator 27.

Capture 11 includes an image lens and a solid-state image sensor such as a charge coupled device (CCD) type image sensor or a complementary metal oxide semiconductor (CMOS) type image sensor. Capture 11 outputs image data of a subject that is obtained by image capturing, to MCU 19.

In a case where wearable camera 10 is put (set) on integrated charging stand 89 or is removed from integrated charging stand 89, a detection terminal CON.DET (not illustrated) of contact terminal 23 is a terminal at which a voltage change occurs. The detection terminal CON.DET of contact terminal 23 is connected to AD converter CV. A signal indicating a voltage change of the detection terminal CON.DET is converted into a digital signal in AD converter CV, and the digital signal is input to MCU 19 via I2C 20.

GPIO 12 is a parallel interface. Recording switch SW1, snapshot switch SW2, communication mode switch SW3, attribute information addition switch SW4, LEDs 26a, 26b, and 26c, vibrator 27, LCD 28, earphone terminal 29C, speaker 29B, and microphone 29A are connected to GPIO 12. GPIO 12 inputs and outputs a signal between each of the various electronic components and MCU 19. Microphone 29A as a sound collector collects a sound around wearable camera 10, and outputs sound data of the collected sound to MCU 19 via GPIO 12. Microphone 29A may be a built-in microphone provided in a housing of wearable camera 10, or may be a wireless microphone connected to wearable camera 10 in a wireless manner. In a case of the wireless microphone, police officer can attach the wireless microphone at any place, and thus a sound collection property of the wireless microphone can be improved. In addition, gyro sensor GY, acceleration sensor AC, and AD converter CV are connected to MCU 19 via a communication interface such as inter-integrated circuit (I2C) 20. A similar effect can be obtained by connecting the detection terminal CON.DET of contact terminal 23 to GPIO 12 without passing through AD converter CV.

RAM 13 is, for example, a work memory used in an operation of MCU 19. ROM 14 stores in advance, for example, a program for controlling MCU 19 and data.

Storage unit 15 is configured with, for example, a storage medium such as a memory card, and starts recording of the video data captured by capture 11 based on an instruction to start automatic recording (that is, a recording start instruction). Storage unit 15 holds the captured video data with a predetermined time length all the time by using prebuffering, and continues to accumulate the video data up to a predetermined time (for example, 30 seconds) before a current time. When receiving a video recording start instruction, storage unit 15 starts recording of the video data, and continues to record subsequent video data until receiving a video recording stop instruction. In addition, storage unit 15 includes a setting data file in which resolution up-conversion information and the like are set. For example, in a case where storage unit 15 is configured with a memory card, storage unit 15 is inserted to the housing of wearable camera 10 so as to be freely removable.

EEPROM 16 stores, for example, identification information for identifying wearable camera 10 (for example, a serial number as a camera ID), and various setting information. RTC 17 checks current time information, and outputs the current time information to MCU 19.

GPS receiver 18 receives a plurality of satellite signals, each of which includes a signal transmission time of the satellite signal and a position coordinate and is transmitted from each of a plurality of GPS transmitters (for example, four navigation satellites), and outputs the plurality of satellite signals to MCU 19. MCU 19 calculates a current position coordinate of wearable camera 10 and a satellite signal reception time based on the plurality of satellite signals. The calculation may be executed by GPS receiver 18 instead of MCU 19. The satellite signal reception time information may also be used for correction of a system time of wearable camera 10. The system time is used for recording a capture time of the captured image (including a still image and a moving image) or the like.

MCU 19 functions as a controller of wearable camera 10, and executes, for example, control processing of totally controlling operations of each component of wearable camera 10, data input and output processing between each component of wearable camera 10, data computation (calculation) processing, and data storing processing. MCU 19 operates based on a program and data stored in ROM 14. When operating, MCU 19 uses RAM 13, obtains the current time information from RTC 17, and obtains current position information from GPS receiver 18.

MCU 19 includes detector 19z that can be realized by execution of an application program, and generates sound data by using detector 19z based on a sound collected by microphone 29A. In addition, detector 19z detects an instruction by a sound signal such as a DTMF signal to be described, from sound data of an analog sound collected by microphone 29A. MCU 19 causes wearable camera 10 to execute an operation corresponding to the instruction acquired by detector 19z.

BLE communicator 21A communicates with smartphone 40 or the like using a communication mode of Bluetooth (registered trademark) low energy (BLE), which is a communication standard of short-range wireless communication. BLE is referred as a Bluetooth (registered trademark)

version 4.0. In BLE, communication can be performed with low power consumption, but a communication speed is as low as 100 kbps.

WLAN communicator 21B is connected to smartphone 40 in a case where smartphone 40 operates as an access point using a tethering function, or is connected to wireless LAN (that is, WLAN) such as wireless LAN access point 63P which can be used in police station 4. WLAN communicator 21B performs wireless communication with a connection destination thereof. Compared to BLE, the wireless LAN can perform communication at a high communication speed of several tens Mbps to several hundred Mbps. On the other hand, since the wireless LAN access point for the wireless LAN is connected all the time, power consumption increases.

Wearable camera 10 may include a communication configuration (not illustrated) for performing wireless communication using short-range wireless communication such as near field communication (NFC), or wireless communication using a mobile communication network (for example, long term evolution (LTE)), in addition to BLE communication or WLAN communication. In addition, WLAN communicator 21B or the communication configuration for performing wireless communication using the mobile communication network functions as a receiver that receives an instruction from instruction system 90.

USB interface 22 is a serial bus, and allows wearable camera 10 to be connected to, for example, in-car camera system 30, back end client 70 in the police station, or the like.

Contact terminal 23 is a terminal for electrical connection with a cradle (not illustrated), an external adapter (not illustrated), or the like. Contact terminal 23 is connected to MCU 19 via USB interface 22, and is connected to power supplier 24. Battery 25 can be charged via contact terminal 23, and image data or the like can be transmitted via contact terminal 23.

Contact terminal 23 is provided with, for example, "a charge terminal V+", "a CON.DET terminal", "data terminals D−, D+" and "a ground terminal" (neither illustrated). The CON.DET terminal is a terminal for detecting a voltage and a voltage change. The data terminals D− and D+ are terminals for transmitting an image captured by wearable camera 10 to an external PC or the like, via, for example, a USB connector terminal. The CON.DET terminal, which is a detection terminal of contact terminal 23, is connected to a communication interface such as I2C 20 via AD converter CV, and a voltage value detected in contact terminal 23 is input to MCU 19.

Contact terminal 23 is connected to a connector of the cradle (not illustrated) or the external adapter (not shown), and thus data communication between wearable camera 10 and an external device becomes possible.

Power supplier 24 charges battery 25 by supplying power supply supplied from, for example, the cradle or the external adapter to battery 25 via contact terminal 23. Battery 25 is configured with, for example, a rechargeable secondary battery, and supplies the power supply to each component of wearable camera 10.

Recording switch SW1 is a press button switch for inputting an operation instruction of starting or stopping of recording (moving image capturing), for example, by a press operation of police officer 3. For example, when recording switch SW1 is pressed by an odd number of times, recording (moving image capturing) is started, and when recording switch SW1 is pressed by an even number of times, recording is ended. In addition, when recording switch SW1 is pressed twice in a row, recording switch SW1 functions as an emergency button.

Snapshot switch SW2 is a press button switch for inputting an operation instruction for capturing a still image, for example, by a press operation of police officer 3. For example, every time snapshot switch SW2 is pressed, capturing of a still image when pressing snapshot switch SW2 is performed.

Communication mode switch SW3 is, for example, a slide switch for inputting an operation instruction for setting a communication mode between wearable camera 10 and an external device. The communication mode includes, for example, an access point mode, a station mode, and an OFF mode.

The access point mode is a mode in which wearable camera 10 is connected to, in a wireless manner, smartphone 40 that operates as a wireless LAN access point and is possessed by, for example, police officer 3, and in which communication between wearable camera 10 and smartphone 40 is performed. In the access point mode, smartphone 40 is connected to wearable camera 10. Thus, smartphone 40 can perform display of a current live image captured by wearable camera 10, reproduction of a video recorded by wearable camera 10, display of a still image captured by wearable camera 10, and the like.

The station mode is a mode in which communication is performed using an external device as an access point in a case where wearable camera 10 is connected to the external device using wireless LAN. For example, smartphone 40 may be set as an external device by using a tethering function of smartphone 40. In the station mode, wearable camera 10 can perform various settings, and transmit (upload) recorded images held in wearable camera 10, to in-car camera system 30, and back end client 70 or back end server 50 in police station 4.

An OFF mode is a mode in which a communication operation of the wireless LAN is turned off and the wireless LAN is not used.

Attribute information addition switch SW4 is a press button switch which is operated for adding attribute information to the video data.

LED 26a is, for example, a display that indicates a power supply state (ON/OFF state) of wearable camera 10 and a state of battery 25. LED 26b is, for example, a display that indicates a capturing operation state (recording state) of wearable camera 10. LED 26c is, for example, a display that indicates a communication mode state of wearable camera 10. In addition, when wearable camera 10 receives notification data from back end server 50, three LEDs 26a to 26c perform a blinking operation according to an instruction from MCU 19. At this time, according to information on a sound source that is included in the notification data, MCU 19 changes a blinking pattern of LEDs 26a to 26c.

Gyro sensor GY detects an angular velocity of wearable camera 10 (that is, a rotation angle per unit time), and detects, for example, that police officer 3 who holds or possesses wearable camera 10 falls down (man down). The detection result of gyro sensor GY is input to MCU 19 via I2C 20. By using gyro sensor GY, wearable camera 10 can accurately detect a behavior related to rotation of police officer 3 who holds or possesses wearable camera 10 (for example, falling down to the ground, falling down to the ground due to a shot by a gun, falling down to the ground due to an attack by a weapon).

Acceleration sensor AC as an example of a sensor detects acceleration in three axial directions (so-called x axis, y axis, and z axis) of an orthogonal coordinate system of wearable camera 10, and detects, for example, that police officer 3 falls down (man down), that police officer 3 starts running, or that police officer 3 grips a gun possessed by himself or herself and takes a shooting posture, police officer 3 holding or possessing wearable camera 10. The detection result of acceleration sensor AC is input to MCU 19 via I2C 20. By using acceleration sensor AC, wearable camera 10 can accurately detect a behavior related to a movement or a posture of police officer 3 who holds or possesses wearable camera 10.

MCU 19 detects an input of each switch of recording switch SW1, snapshot switch SW2, communication mode switch SW3, and attribute information addition switch SW4, and performs processing according to an input of a switch in which an operation is performed.

In a case where an operation input of recording switch SW1 is detected, MCU 19 controls starting or stopping of a capturing operation of capture 11, and stores an image obtained from capture 11, into storage unit 15, as a moving image.

In a case where an operation input of snapshot switch SW2 is detected, MCU 19 stores an image obtained from capture 11 when snapshot switch SW2 is operated, into storage unit 15, as a still image.

MCU 19 detects a state of communication mode switch SW3, and operates BLE communicator 21A or WLAN communicator 21B according to a communication mode corresponding to a setting of communication mode switch SW3.

In a case where attribute information addition switch SW4 is pressed, MCU 19 adds attribute information to data of a face image cropped from an image captured by capture 11.

Figure 3:
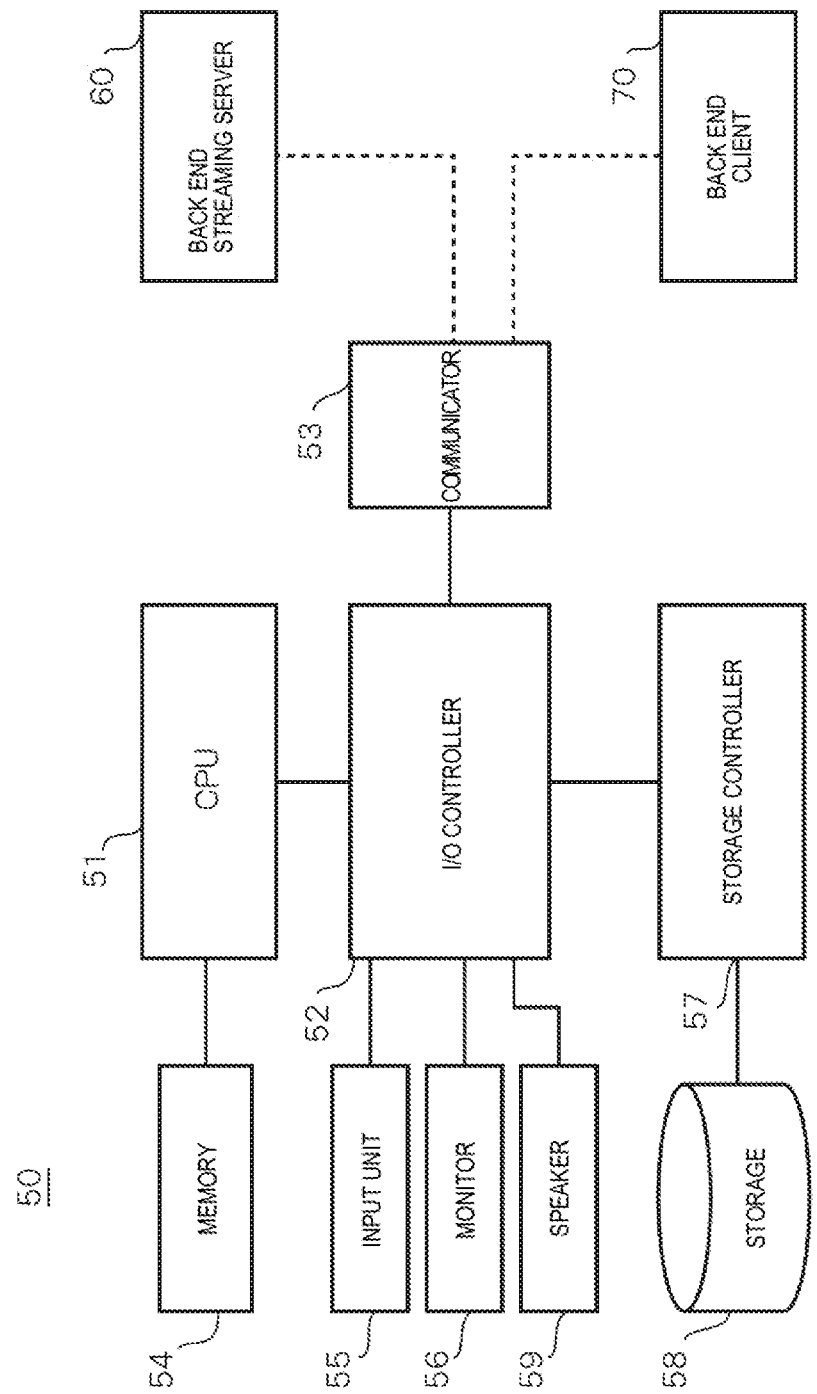
FIG. 3 is a block diagram illustrating an example of a hardware configuration of a back end server according to the present embodiment.

FIG. 3 is a block diagram illustrating an example of a hardware configuration of back end server 50 according to the present embodiment. When receiving the plurality of video data files from wearable camera 10, back end server 50 generates import file list UI 100 (refer to FIG. 7) and thumbnail list. UI 150 (refer to FIG. 8) based on the video data files.

Back end server 50 as an example of a server includes CPU 51, I/O controller 52, communicator 53, memory 54, input unit 55, monitor 56, speaker 59, storage controller 57, and storage 58.

CPU 51 performs, for example, control processing of totally controlling operations of each component of back end server 50, data input and output processing between each component of back end server 50, data computation (calculation) processing, and data storing processing. CPU 51 operates based on a program and data stored in memory 54.

I/O controller 52 performs control related to data input and output between CPU 51 and each component (for example, communicator 53, input unit 55, monitor 56, storage controller 57) of back end server 50, and performs data relay to and from CPU 51. I/O controller 52 may be integrally configured with CPU 51.

Communicator 53 performs communication with, for example, in-car PC 32 and in-car recorder 33, smartphone 40, wearable camera 10 held or possessed by police officer 3, or back end client 70, in a wired manner or a wireless manner.

Memory 54 is configured with, for example, a RAM, a ROM, a nonvolatile semiconductor memory, or a volatile semiconductor memory, functions as a work memory when CPU 51 is operated, and stores predetermined programs and data for operating CPU 51.

Input unit 55 is a user interface (UI) for receiving an input operation of police officer 3 or a person in charge in police station 4, and notifying the input operation to CPU 51 via I/O controller 52. Input unit 55 is, for example, a pointing device such as a mouse or a keyboard. Input unit 55 may be disposed, for example, at a position corresponding to a screen of monitor 56, and may be configured with a touch panel or a touch pad that can be operated by a finger or a stylus pen of police officer 3 or a person in charge. In addition, back end server 50 may be also operated by back end client 70 connected via the network in police station 4.

Monitor 56 is configured with, for example, an LCD or an organic EL, and displays various kinds of information. In a case where a video captured or recorded by wearable camera 10 is input, for example, according to an input operation of police officer 3 or a person in charge, monitor 56 displays the video on the screen based on an instruction of CPU 51. In a case where a video captured or recorded by in-car camera 31 is input, for example, according to an input operation of police officer 3 or a person in charge, monitor 56 displays the video on the screen based on an instruction of CPU 51. In addition, in a case where back end server 50 is operated by back end client 70 connected via the network in police station 4, various kinds of information are displayed on back end client 70.

In a case where a sound collected by wearable camera 10 is input, for example, according to an input operation of police officer 3 or a person in charge, speaker 59 outputs the sound based on an instruction of CPU 51. In addition, in a case where back end server 50 is operated by back end client 70 connected via the network in police station 4, the sound is output to a speaker connected to back end client 70.

In a case where CPU 51 requests back end streaming server 60 to transmit the video data which is captured and accumulated, storage controller 57 controls an operation of storing the video data, which is received in response to the request, in storage 58, and the like. Storage 58 is a storage device such as an SSD or an HDD that is controlled by storage controller 57, and accumulates the captured video data which is transmitted from wearable camera 10 via I/O controller 52, according to an instruction from CPU 51.

Hereinafter, an image analysis operation of monitoring video analysis system 5 with the above-described configuration will be described.

First, tracking which is executed in the present embodiment refers to an operation of reproducing the video data as substance of the video data file (in other words, by playing back a plurality of frame images constituting the video data in order), searching an object which appears in each frame image, and acquiring a position (for example, a coordinate) of an object on each frame image. In the following description, an object refers to, for example, a person, a face of a person, or a tangible object having a shape or a pattern similar to a person or a face of a person.

Figure 7:
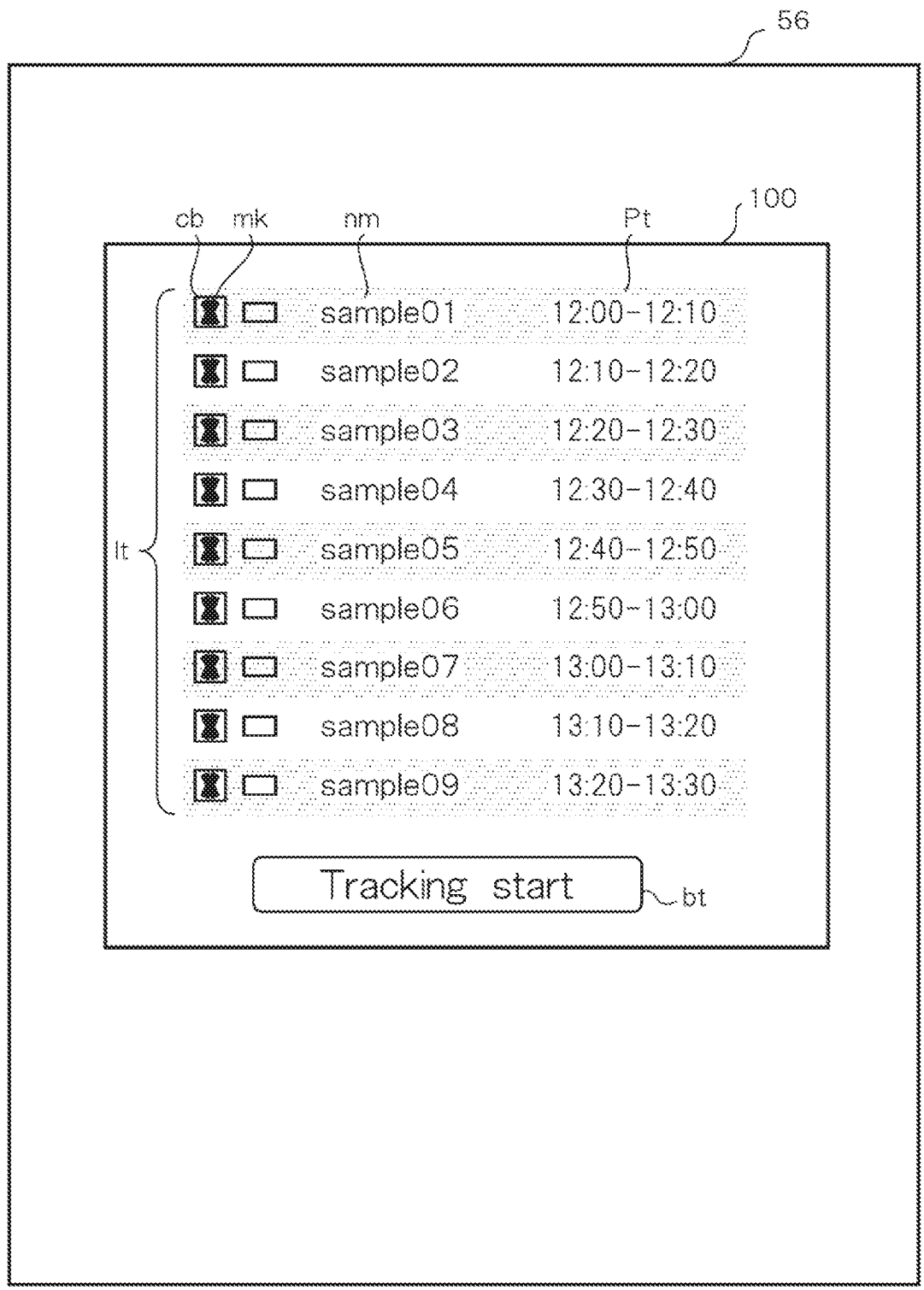
FIG. 7 is a diagram illustrating an import file list UI displayed on a monitor of the back end server according to the present embodiment.

In addition, in a case where a video of one scene (for example, 90-minute video) is captured by wearable camera 10, nine video data files are generated in time series for each capturing period (10 minutes) (refer to FIG. 7). As described later, nine video data files recorded in wearable camera 10 are collectively imported and input to back end server 50.

Figure 4:
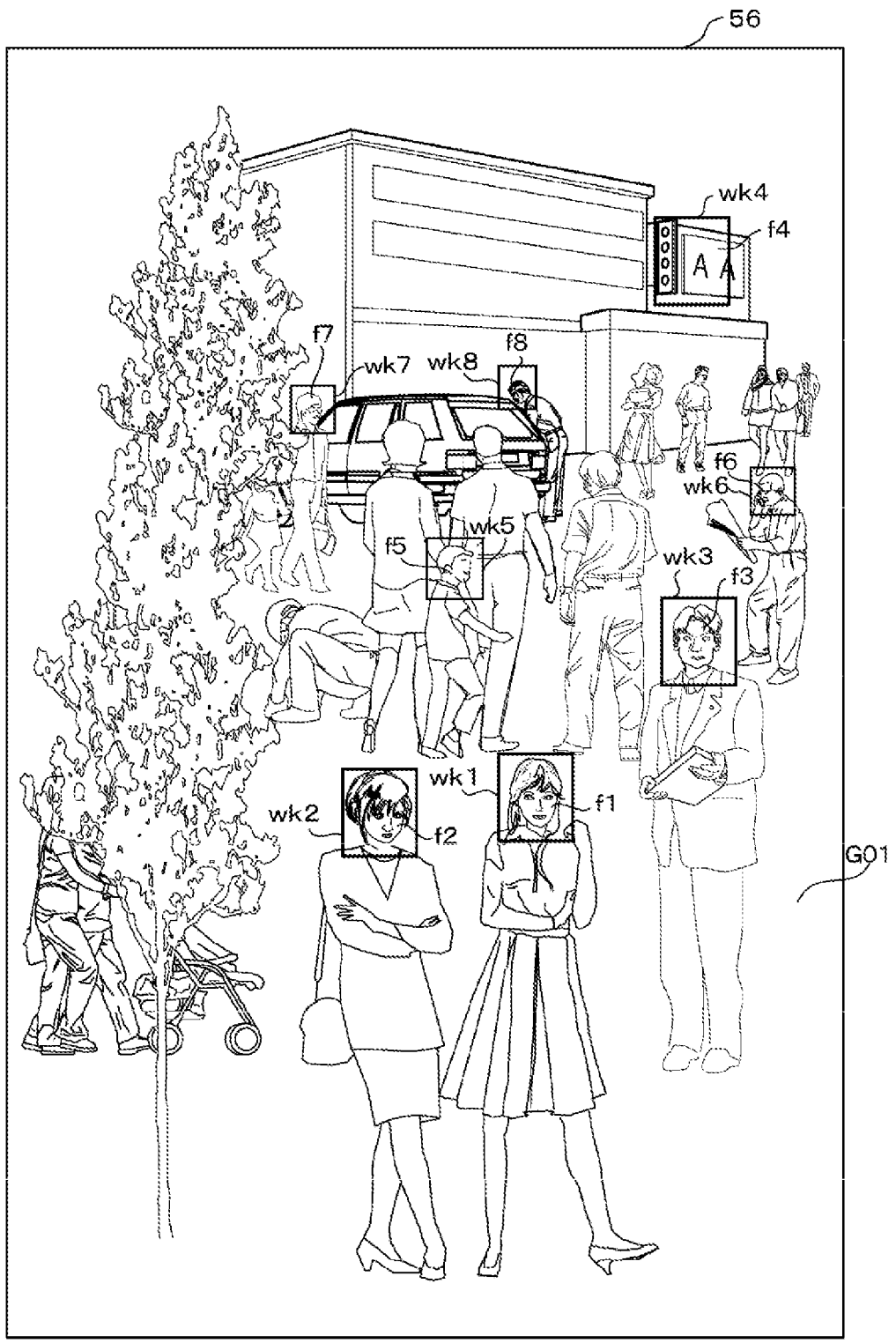
FIG. 4 is a diagram illustrating a frame in an initial capturing period of a video captured by the wearable camera according to the present embodiment.

FIG. 4 is a diagram illustrating frame G01 in an initial (first) capturing period of a video captured by wearable camera 10 according to the present embodiment. Frame G01 is a frame constituting a video with a file name "sample01" (refer to FIG. 7), and is, for example, a first frame among a plurality of frames constituting a video captured in the same capturing area (for example, an incident site, an accident site, or a place under patrol, and hereinafter, the same as above). In frame G01 illustrated in FIG. 4, many persons walking on a street appear. In frame G01, faces f1 to f8 as eight objects are recognized by the face recognition function of CPU 51 of back end server 50. Here, face f4 is a target (object) recognized as a face of a person by a mistake. In frame G01, solid-line borders wk1 to wk8 are drawn by CPU 51 so as to surround each of recognized faces f1 to f8.

Figure 5:
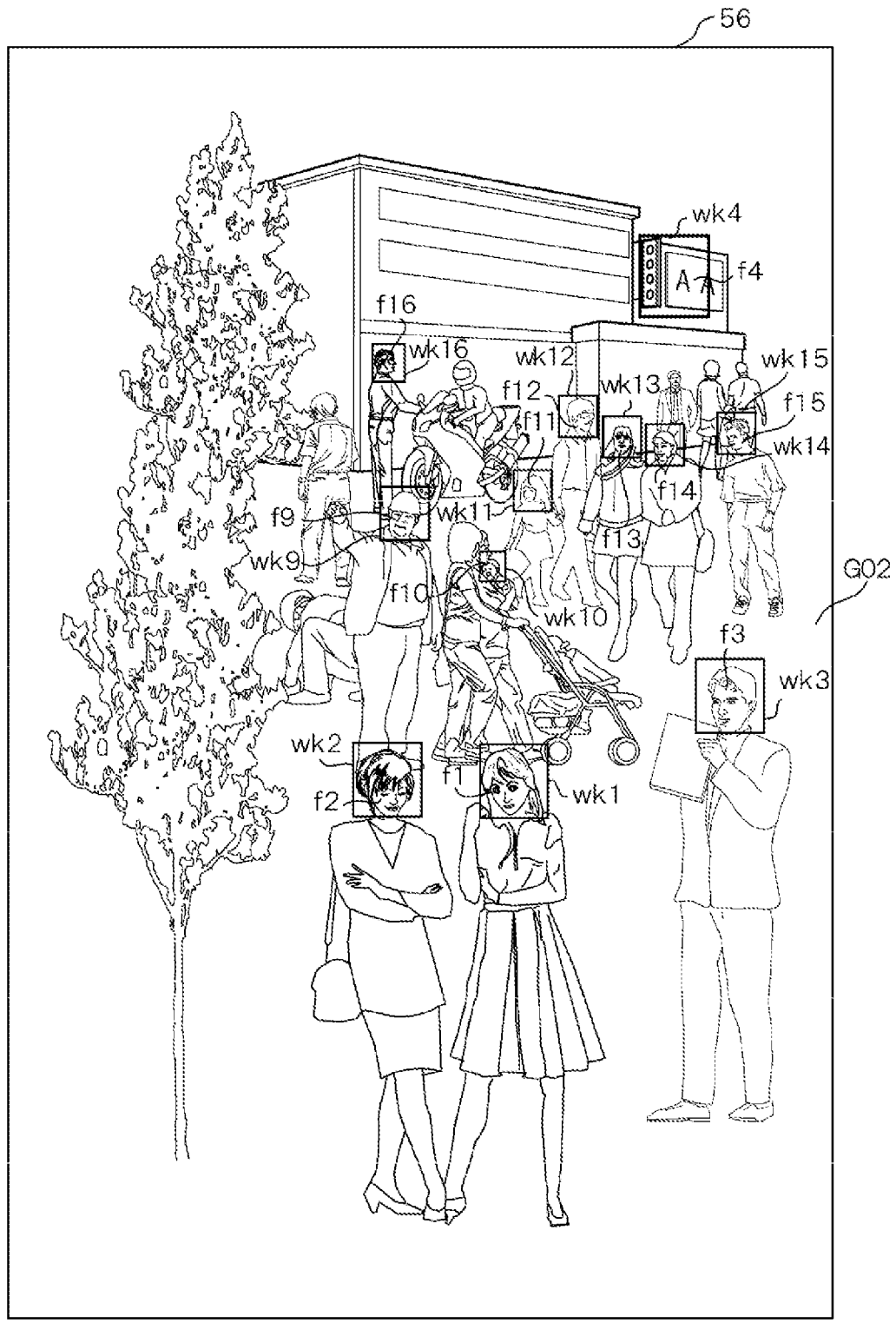
FIG. 5 is a diagram illustrating a frame in a next capturing period of a video captured by the wearable camera according to the present embodiment.

FIG. 5 is a diagram illustrating frame G02 in a next capturing period of a video captured by wearable camera 10 according to the present embodiment. Frame G02 is a frame constituting a video with a file name "sample02" (refer to FIG. 7), and is, for example, a first frame among a plurality of frames constituting a video captured in the same capturing area. Capturing of frame G02 is started at a time (that is, 12:10 illustrated in FIG. 7) later than a capturing start time of the video with the file name "sample01" (for example, 12:00 illustrated in FIG. 7) by a predetermined time (10 minutes). In frame G02 illustrated in FIG. 5, twelve faces f1 to f4 and f9 to f16 are recognized by the face recognition function of CPU 51 of back end server 50. In frame G02, solid-line borders wk1 to wk4 and wk9 to wk16 are drawn by CPU 51 so as to surround each of recognized faces f1 to f4 and f9 to f16.

Figure 6:
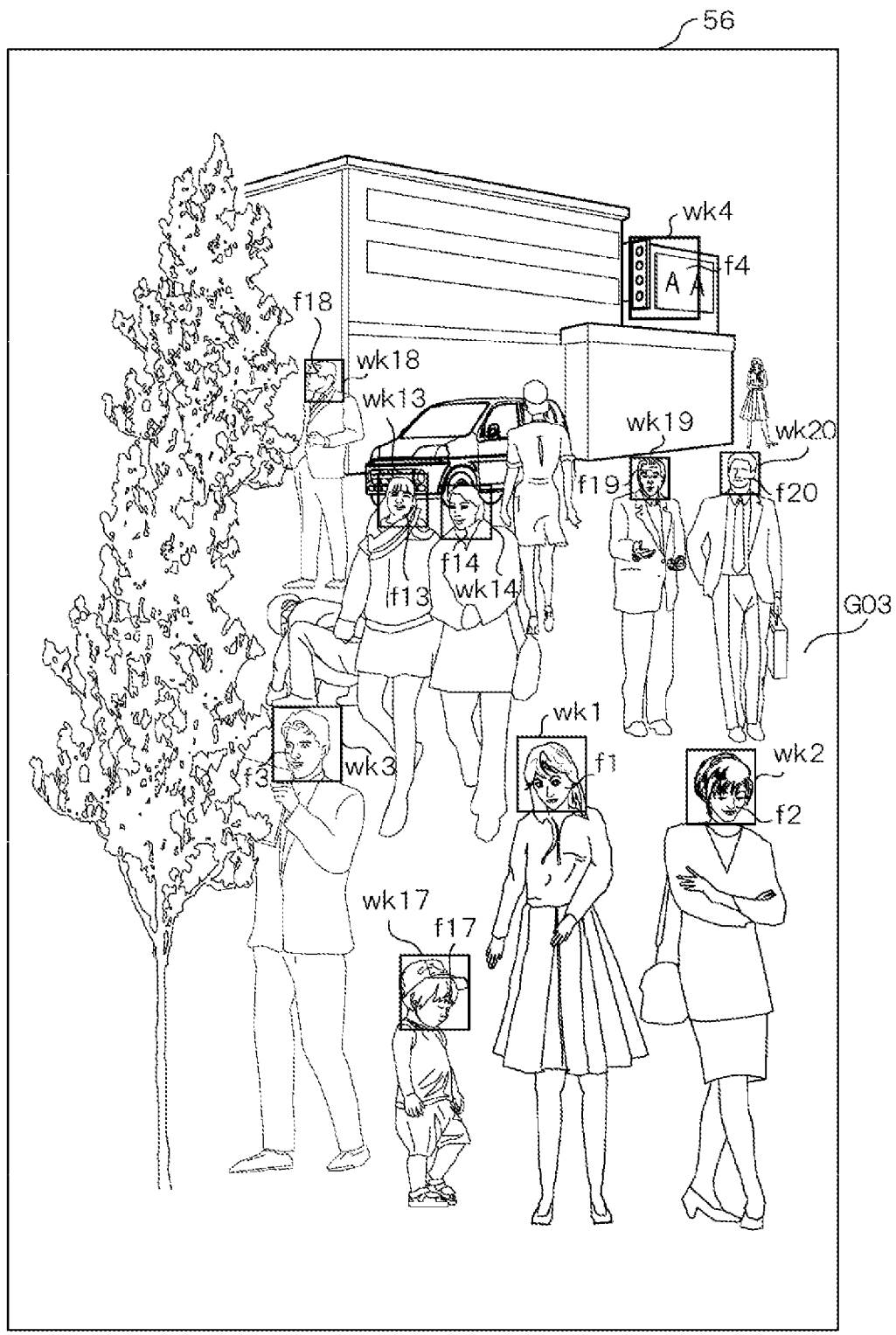
FIG. 6 is a diagram illustrating a frame in a further next capturing period of a video captured by the wearable camera according to the present embodiment.

FIG. 6 is a diagram illustrating frame G03 in a further next capturing period of a video captured by wearable camera 10 according to the present embodiment. Frame G03 is a frame constituting a video with a file name "sample03" (refer to FIG. 7), and is, for example, a first frame among a plurality of frames constituting a video captured in the same capturing area. Capturing of frame G03 is started at a time (that is, 12:20 illustrated in FIG. 7) later than a capturing start time of the video with the file name "sample02" (for example, 12:10 illustrated in FIG. 7) by a predetermined time (10 minutes). In frame G03 illustrated in FIG. 6, ten faces f1 to f4, f13, f14, and f17 to f20 are recognized by the face recognition function of CPU 51 of back end server 50. In frame G03, solid-line borders wk1 to wk4, wk13, wk14, and wk17 to wk20 are drawn by CPU 51 so as to surround each of recognized faces f1 to f4, f13, f14, and f17 to f20.

Here, as an example, in a case where a face of the same person appears in three video data files among nine video data files (refer to FIG. 7), CPU 51 extracts the face of the person appearing (present) in the video data files of a predetermined number or more (for example, three), as an object. For example, in FIGS. 4 to 6, since three faces f1, f2, and f3 appear in three video data files with file names "sample01", "sample02", and "sample03", CPU 51 of back end server 50 determines the faces as objects. On the other hand, faces f13 and f14 appear in the plurality of video data files, and particularly, appear only in two video data files with the file names "sample02" and "sample03". Thus, CPU 51 determines that faces f13 and f14 are not objects appearing (present) in the video data files of a predetermined number or more.

FIG. 7 is a diagram illustrating an import file list UI 100 displayed on monitor 56 of back end server 50 according to the present embodiment. Import file list UI 100 is automatically generated by CPU 51 of back end server 50 when a plurality of video data files corresponding to a video of one scene are input to back end server 50. Import file list UI 100 includes import file list lt and tracking start button bt, and is displayed on monitor 56.

In import file list lt, information on a plurality of input video data files is registered for each column so as to be displayed in a list. In each column, information such as check box cb, file name nm, and capturing period pt is described, the information corresponding to each video data file. Check box cb allows a user to perform a selection operation, and receives whether or not to select the corresponding video data file as a video data file to be tracked. In a case where check box cb includes selection mark mk (in FIG. 7, a black mark), check box cb represents a selection state, and in a case where check box cb is blank, check box cb represents a non-selection state.

File name nm illustrated in FIG. 7 is, for example, a name automatically added by wearable camera 10. Here, file name nm is "sample01" to "sample09", and is expressed by a combination of first identification information representing a scene and second identification information representing each of video data files divided in time series. Specifically, "sample" corresponds to the first identification information, and "01" to "09" correspond to the second identification information. File name nm is an item which is allowed to receive an input operation of a user and receive any change in the name.

Capturing period pt represents a time zone during which each video is captured by wearable camera 10. For example, the video data file of a first column, for which check box cb is selected and the file name is "sample01", and for which capturing period pt is 10 minutes of "12:00-12:10", is registered as a video data file to be tracked. The same is applied to the video data files of second and subsequent columns.

In this way, by dividing a video of a scene into a plurality of video data files and storing the plurality of video data files, availability of the video captured by wearable camera 10 can be enhanced. In addition, in a case where a memory capacity of storage unit 15 of wearable camera 10 decreases, the divided video data files are overwritten or deleted one by one. Therefore, as compared to a case where a video data file with a long recording time length that has a large data amount is deleted at once, it is possible to extend a period during which a captured video of a scene remains. In addition, since a time zone from "12:00-12:10" to "13:20-13:30" continues as capturing period pt, there is no blank (non-capturing) time zone in which a video is not captured, and thus continuity of a captured video of wearable camera 10 (that is, continuous video composition without an interruption) is guaranteed.

Tracking start button bt displayed at the lower portion of import file list UI 100 (in FIG. 7, denoted as "Tracking start") is a button which can be operated by a user of back end server 50 or a user of back end client 70 as a client PC that can be used by accessing back end server 50. When tracking start button bt is clicked, back end server 50 starts tracking of a video data file "sample01". As described above, tracking is an operation of playing back frames of a video data file in order, searching each frame in which a selected object appears, and acquiring a position of the object in each frame.

Figure 8:
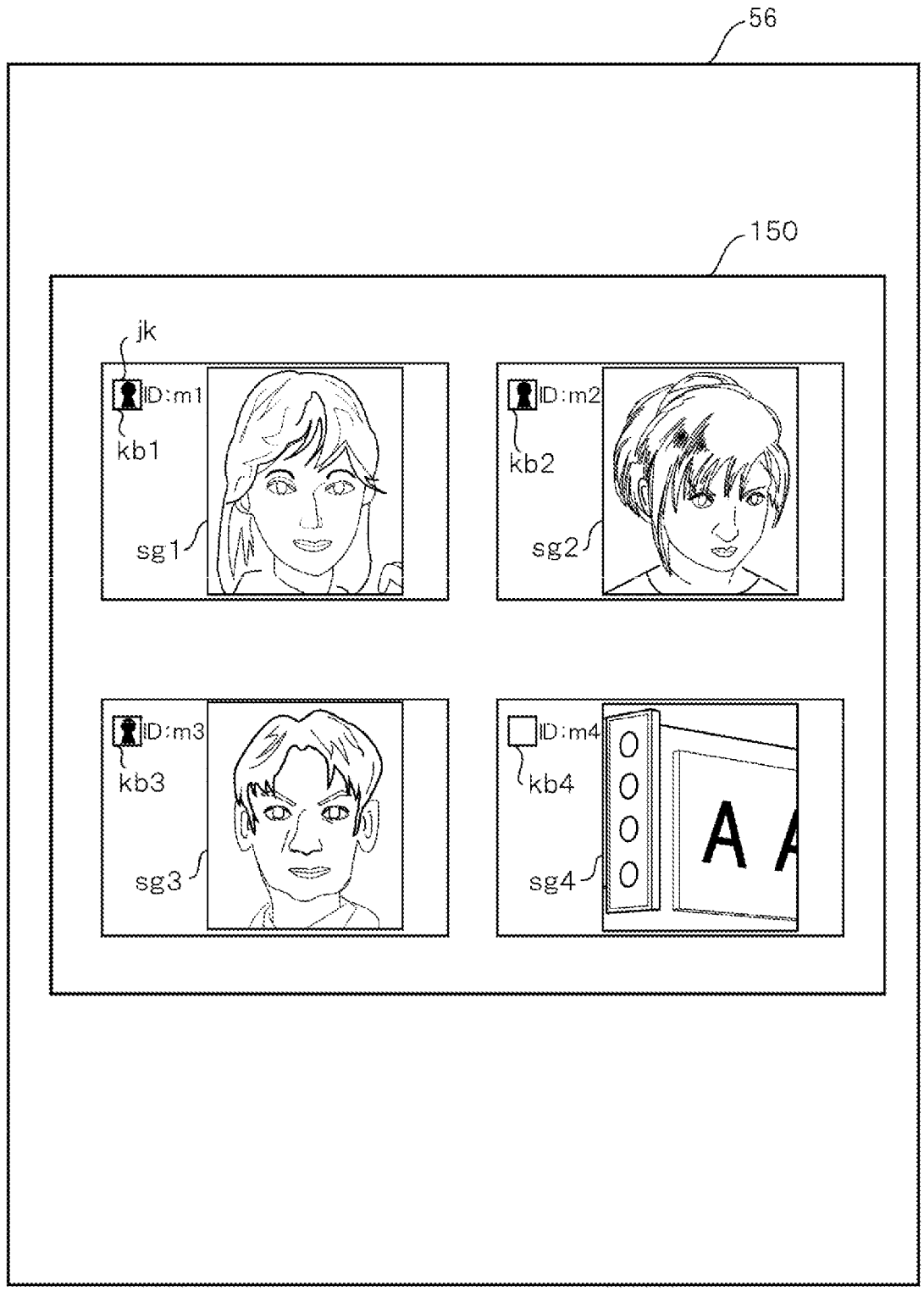
FIG. 8 is a diagram illustrating an thumbnail list UI in which thumbnails of faces appearing in a plurality of video data files are registered.

FIG. 8 is a diagram illustrating thumbnail list UI 150 in which thumbnails sg1 to sg4 of faces appearing in a plurality of video data files are registered. Here, thumbnails of objects (for example, faces of persons) appearing in the video data files of a predetermined number or more (for example, three) are illustrated. Each thumbnail may be generated by CPU 51, or may be generated in advance by wearable camera 10.

In thumbnail list UI 150, thumbnails sg1 to sg4 of a plurality of objects (faces of persons), identification numbers (IDs) m1 to m4 for identifying each of thumbnails sg1 to sg4, and check boxes kb1 to kb4 for selecting whether or not the face is wanted (for example, a face of a possible suspect of an incident or a face of a wanted criminal) by a user of back end server 50 or a user of back end client 70 as a client PC that can be used by accessing back end server 50, are displayed. Thumbnails sg1 to sg4 are simply referred to as thumbnail sg in a case where there is no need to distinguish thumbnails sg1 to sg4 in particular. Similarly, in a case where there is no need to distinguish identification numbers m1 to m4 in particular, identification numbers m1 to m4 are simply referred to as identification number mj. Similarly, in a case where there is no need to distinguish check boxes kb1 to kb4 in particular, check boxes kb1 to kb4 are simply referred to as check box kb.

Check box kb of thumbnail list UI 150 allows a user to perform a selection operation, and receives whether or not to select the corresponding object as a suspect candidate object. In a stage where a face of a person is identified as an object, selection mark jk is added to each of check boxes kb1 to kb4 of thumbnails sg1 to sg4 by back end server 50. In a case where check box kb includes selection mark jk, check box kb represents a selection state, and in a case where check box kb is blank, check box kb represents a non-selection state. Every time police officer 3 clicks check box kb, selection mark jk added to check box kb is switched between a selection state and a non-selection state. In FIG. 8, since thumbnail sg4 is not a face image and is an image of a target recognized as a face by a mistake, check box kb4 is clicked to be blank by police officer 3. Therefore, the target such as a wall that is expressed by thumbnail sg4 is excluded from targets to be confirmed by a user, or is excluded from persons such as suspects or the like that are related to an incident.

Here, in a case where a face of a person appears in a plurality (here, three or more) of video data files, thumbnail sg of the face of the person is displayed on thumbnail list UI 150. On the other hand, in a case where the number of times a face of a person appears is equal to or greater than a predetermined number of times (for example, three times), a thumbnail of the face of the person may be displayed on thumbnail list UI 150. The predetermined number of times may be arbitrarily set by an operation of a user of back end server 50 or a user of back end client 70 as a client PC that can be used by accessing back end server 50. In addition, as an appearance time of a face of a person or the number of times of appearance of a face of a person increases, a display order of thumbnail sg may become high. Further, when displaying thumbnails, back end server 50 may access the suspicious person database in which an ex-convict or the like is registered, and add character information indicating an ex-convict or the like, to a face that matches with a face of an ex-convict or the like, thereby supporting search of suspect candidates. Furthermore, back end server 50 displays face images as thumbnails, and thereby reducing the memory capacity and increasing a display speed. On the other hand, back end server 50 may display face images as raw images, and in this case, more detailed information may be obtained from the face images.

FIG. 9 is a flowchart explaining in detail one example of an image analysis operation procedure of back end server 50 according to the present embodiment. The operation is executed by back end server 50. Back end server 50 imports and receives a plurality of video data files constituting a video of one scene captured by wearable camera 10, via input unit 55 or communicator 53 (S1). For example, in a case where the video data files are received via input unit 55, police officer 3 puts wearable camera 10 on integrated charging stand 89. Input unit 55 is connected to integrated charging stand 89 via a Universal Serial Bus (USB) cable, and can read the video data files stored in storage unit 15 of wearable camera 10. In addition, police officer 3 may connect wearable camera 10 directly to input unit 55, and in this case, the video data files stored in wearable camera 10 may be read.

On the other hand, in a case of receiving the video data files via communicator 53, communicator 53 receives the video data files stored in wearable camera 10 via wireless LAN access point 63P or via back end streaming server 60 or back end client 70.

CPU 51 temporarily stores the plurality of video data files which are input, into storage 58, and generates import file list UI 100 (refer to FIG. 7) based on the video data files. Further, CPU 51 displays generated import file list UI 100 on monitor 56.

When a click operation on tracking start button bt (that is, selection of tracking start button bt) is performed by police officer 3 as a user, CPU 51 reads and develops each of the plurality of video data files in frame units into memory 54, and automatically determines an object appearing in a first frame of each of the video data files which are read (S2).

Based on the object automatically determined in step S2, CPU 51 automatically determines the presence or absence of the object in each frame of second and subsequent frames (83) by playing back each frame from a first frame of each of the video data files which are read into memory 54, in order (that is, by reproducing the video data files in order from the first frame in which the object first appears). In this way, CPU 51 performs tracking of each of the video data files.

In a case where a face of the same person appears in the plurality of continuous video data files with different capturing time zones, that is, in a case where a face of the same person appears in the continuous video data files of a predetermined number or more (for example, three), the continuous video data files having different capturing time zones of one scene, it is assumed that the face of the same person appears continuously in the video for a long time. In the present embodiment, based on the assumption, in a case where a face of the same person appears in the plurality of continuous video data files with different capturing time zones, CPU 51 of back end server 50 determines that the face is an object having a possibility of being a person wanted by a user (for example, a suspect of an incident or an accident, or a wanted criminal). In this way, in a case where the number of times the face of the same person appears is equal to or greater than a predetermined number of times (for example, three times), CPU 51 extracts the object. The predetermined number of times may be a fixed value, or may be arbitrarily set by the police officer via input unit 55 of back end server 50. Therefore, it is possible to improve object determination accuracy.

CPU 51 stores a coordinate value of the object which is determined for each frame of each of the video data files (a position of the object in each frame), into memory 54, as metadata (S4). The coordinate value of the object is held as metadata, and thus it is possible to recognize a movement of the object by performing data analysis to be described later. Thereby, this leads to an improvement in determination accuracy when determining whether or not the object is a suspect. CPU 51 stores thumbnail sg of the object in the first frame into memory 54, the object in the first frame being automatically determined in step S3 (S5).

CPU 51 displays thumbnail list UI 150 (refer to FIG. 8) in which a list of thumbnails sg is registered, on monitor 56 (S6). CPU 51 determines whether or not an object registered in thumbnail list UI 150 is selected by a user (S7). In a case where an object registered in thumbnail list UI 150 is not selected, CPU 51 ends the operation.

On the other hand, in a case where an object registered in thumbnail list UI 150 is selected by a user, that is, in a case where selection mark jk is added to check box kb, CPU 51 reproduces a movie (video data file) in which the selected object first appears (88). When reproducing the movie, all video data files in which the selected object appears may be continuously reproduced. Thus, the police officer can determine whether or not the object is a suspect by confirming the reproduced movie. Thereafter, CPU 51 ends the operation.

As described above, monitoring video analysis system 5 according to the present embodiment includes wearable camera 10 which is held or possessed by police officer 3 (user), and back end server 50 (server) for receiving a video captured by wearable camera 10. Wearable camera 10 generates and records a video of a scene for each 10 minutes (for each predetermined time). Back end server 50 determines a face (object) of a person appearing in n (n is an integer of two or more) captured videos by using a plurality of captured videos of the scene for each 10 minutes (for each predetermined time), and displays thumbnail list UI 150 in which the determined face of the person is registered (a list screen of one or more objects), on monitor 56.

As described above, in the videos of the scene that are captured by wearable camera 10, in a case where back end server 50 detects (determines) that a face (object) of a suspect appears for a long time in the plurality of continuous video data files with different capturing time zones, the object that the user wants to search appears (exists) many times in the plurality of video data files, which are divided and recorded in time series and have continuous capturing time zones. Accordingly, back end server 50 can quickly search an object such as a person's face appearing in the plurality of captured videos, and efficiently support a search task of an object as a target, by using availability of the captured videos of the wearable camera.

In a case where wearable camera 10 continues to capture the same place, a captured video of one scene is a captured video having the same capturing area. On the other hand, in a case where the police officer continues to capture while moving, a captured video of one scene is a video which is sectioned by a time zone or a changed place. In addition, a video which is captured by wearable camera 10 during a period for which the police officer starts video recording and then stops video recording may be a captured video of one scene.

Further, when the police officer selects check box kb from thumbnails sg of objects registered in thumbnail list UI 150 displayed on monitor 56, and performs an operation (user operation) of removing selection mark jk, back end server 50 excludes the selected object from tracking targets, that is, determines that the object is not a suspect.

Accordingly, even when an object which is not related to a face of a suspect is erroneously recognized due to erroneous determination, the object can be easily omitted from the suspect candidates. In addition, by omitting the object that the police officer (user) apparently determines as not a suspect, it is possible to reliably reflect an intention of the user.

In addition, back end server 50 displays thumbnails sg (thumbnail images) of objects on monitor 56, as thumbnail list UI 150 (a list of objects).

Accordingly, the police officer (user) can visually determine whether or not the object is a suspect by confirming the thumbnails of the objects with eyes.

In addition, back end server 50 holds the coordinate value of the object in each frame of the captured video, as metadata.

Accordingly, it is possible to recognize a position of the object in each of the plurality of frames of the captured video, and thus it is possible to recognize a movement of the object. Thereby, this leads to an improvement in determination accuracy when determining whether or not the object is a suspect.

In addition, the object is a face of a person. Accordingly, back end server 50 can recognize the object with high accuracy by using a face recognition function. Therefore, the police officer can easily identify a suspect.

Although the embodiment has been described with reference to the drawings, the present disclosure is not limited to the examples. It is clear for those skilled in the art that various modifications or alterations can be made hereto without departing from the spirit and scope of the present invention. In addition, it should be understood by those skilled in the art that the various modifications or alterations are included in the scope of the present disclosure.

For example, in the embodiment, wearable camera 10 may generate a plurality of video data files by recording data files (video data files) of the captured video into the memory every time capturing for a predetermined short period of time (for example, 10 minutes) is completed. Alternatively, after capturing for a long time, wearable camera 10 may generate a plurality of video data files by dividing the captured video into a plurality of video data files, and record the plurality of video data files into the memory.

Further, in the embodiment, although wearable camera 10 generates the video data files for each 10 minutes, that is, for each predetermined time, when capturing a video of one scene in the same capturing area, the capturing time unit is not limited to 10 minute unit. Wearable camera 10 may generate the video data files in any predetermined time unit such as 5 minute unit or 20 minute unit. In addition, the predetermined time may be a fixed value, or may be set arbitrarily for the wearable camera by the user. Accordingly, an appropriate predetermined time can be set according to a scene of a video.

In addition, in the embodiment, although back end server 50 has a face recognition function of recognizing a face of a person from the captured video, wearable camera 10 may have a face recognition function, or may add face recognition information to the video data files.

In addition, in the embodiment, a case where back end server 50 generates the import file list UI is described. On the other hand, in a case where wearable camera 10 includes a touch panel or the like, wearable camera 10 may generate the import file list UI, display the generated import file list UI on the touch panel or the like, and receive a selection operation by the user. In this case, wearable camera 10 may transmit the received selection information to the back end server.

In addition, in the embodiment, a case where back end server 50 generates the thumbnail list UI is described. On the other hand, in a case where wearable camera 10 has a face recognition function and includes a touch panel or the like, wearable camera 10 may generate the thumbnail list UI, display the generated thumbnail list UI on the touch panel or the like, and receive a selection operation by the user. In this case, it is possible to determine a suspect by using only the wearable camera.

In addition, in the embodiment, in a case where the number of times an object appears in the plurality of video data files is equal to or greater than a predetermined number of times, it is assumed that the object is an object to be registered in the thumbnail list UI. Further, the number of objects appearing in each frame of each of the plurality of video data files may be counted. In this case, based on the count value, registration of the object in the thumbnail list UI, the order of registration, the size of the thumbnail image, and the like may be determined, and thus determination accuracy of the object to be registered in the thumbnail list UI can be further improved.

In addition, in the embodiment, a case where an object (for example, a face of a person) appearing in the plurality of video data files is a suspect candidate of an incident, is assumed. On the other hand, in a case where a missing incident occurs, an object appearing in the plurality of video data files may be determined as a missing person candidate, and thus back end server 50 can support searching of a missing person by finding a face.

In addition, in the embodiment, a case where there are a plurality of objects and a video in which at least one of the plurality of objects appears is tracked, is described. On the other hand, a video in which all of the plurality of objects appear may be tracked, or a video in which at least specific objects selected by the user appear may be tracked. Accordingly, it is possible to determine a suspect flexibly and quickly.

In addition, in the embodiment, a case where an object appearing in the plurality of video data files is a face is described. On the other hand, an object may be an appearance of a person, a signboard, a number plate of a vehicle, or the like, in addition to a face. In this case, back end server 50 has a function of recognizing the object in each frame.

In addition, in the embodiment, a size of a frame surrounding an object is changed according to a size of a face. On the other hand, the size of the frame may be a predetermined size such that a processing load can be reduced. In this case, when the plurality of objects are close to each other, these frames may be displayed partially overlapping with each other in some cases.

In addition, in the embodiment, a case where the wearable camera which is held or possessed by the police officer captures a video is described. On the other hand, even in a case of capturing a video using the In-car video system (ICV) mounted on a police patrol car, the present disclosure can be similarly applied to the case.

What is claimed is:

1. A monitoring video analysis system comprising:
a wearable camera, which, in operation, is held or possessed by a user,
wherein the wearable camera, in operation, generates and records a plurality of video files including captured video of a scene, each of the video files being captured during a respective time period among a plurality of predetermined time periods,
wherein each of the predetermined time periods has a same duration, and
wherein the wearable camera, in operation, continuously generates and records the video files including the captured video of the scene such that there is no blank time zone in which the video of the scene is not captured from a beginning of a first one of the time periods to an end of a last one of the time periods; and
a server, which, in operation, receives the video files recorded by the wearable camera,
wherein the server, in operation, determines one or more objects appearing in at least n of the video files, generates a list including the one or more objects, causes the list including the one or more objects to be displayed on a monitor and causes the at least n of the video files to be continuously reproduced on the monitor, and
wherein n is an integer of two or more.

2. The system of claim 1,
wherein the server, in operation, excludes an object which is selected from the one or more objects included in the list by an operation of the user, from targets of processing of acquiring a position of the object in a frame image.

3. The system of claim 1,
wherein the server, in operation, displays on the monitor a thumbnail image of each of the one or more objects included in the list.

4. The system of claim 1,
wherein the server, in operation, holds as metadata coordinate values of the one or more objects in each frame image of a plurality of frame images constituting the captured video.

5. The system of claim 1,
wherein the at least one of the one or more objects is a face of a person.

6. A monitoring video analysis method utilizing a server and a wearable camera that is held or possessed by a user, the method comprising:
generating and recording a plurality of video files including captured video of a scene, each of the video files being captured during a respective time period among a plurality of predetermined time periods by the wearable camera,
wherein each of the predetermined time periods has a same duration, and
wherein the generating and recording is performed such that there is no blank time zone in which the video of the scene is not captured from a beginning of a first one of the time periods to an end of a last one of the time periods;
receiving, by the server, the video files recorded by the wearable camera;
determining, by the server, one or more objects appearing in at least n of the video files wherein n is an integer of two or more;
generating, by the server, a list including the one or more objects;
displaying on a monitor the list including the one or more objects;
continuously reproducing on the monitor the at least n of the video files.

7. The monitoring video analysis method of claim 6, further comprising:
receiving by the server a user selection of an object in the list including the one or more objects;
acquiring a position in a frame image of each of the one or more objects other than the object selected by the user selection.

8. The monitoring video analysis method of claim 7, further comprising displaying character information regarding the one or more objects.

9. The monitoring video analysis system of claim 1, wherein the server, in operation, receives a user selection of an object in the list including the one or more objects, and acquires a position in a frame image of each of the one or more objects other than the object selected by the user selection.

10. The monitoring video analysis system of claim 9, wherein the server, in operation, causes character information regarding the one or more objects to be displayed.

11. The monitoring video analysis method of claim 6, wherein n is greater than or equal to three.

12. The monitoring video analysis method of claim 6, wherein each of the predetermined time periods overlaps another one of the predetermined time periods.

13. The monitoring video analysis system of claim 1, wherein n is greater than or equal to three.

14. The monitoring video analysis system of claim 1, wherein each of the predetermined time periods overlaps another one of the predetermined time periods.

* * * * *